United States Patent Office 2,937,356
Patented May 17, 1960

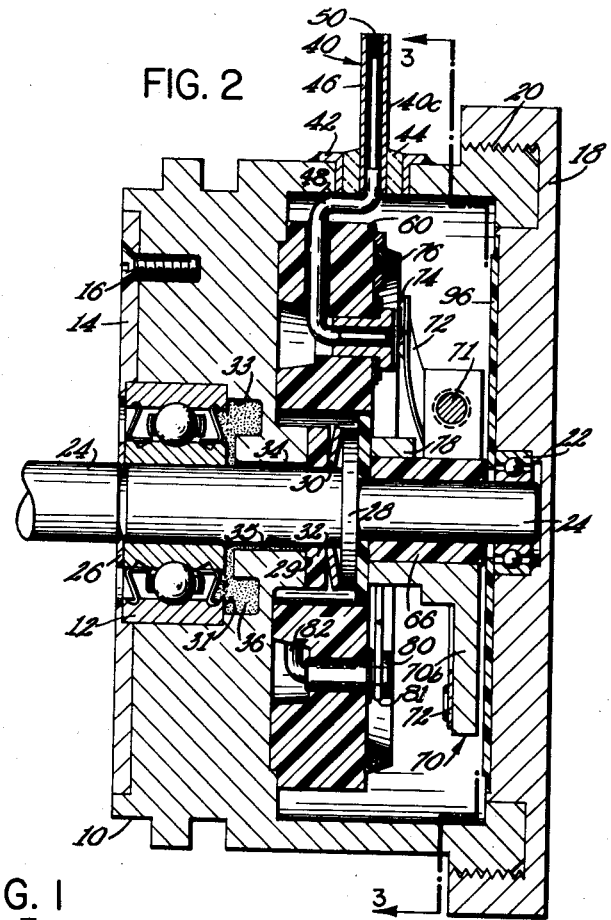

2,937,356

SEALED PRECISION VARIABLE RESISTANCE DEVICE EMPLOYING ROTARY SHAFT

Arnold S. Louis, New York, N.Y.

Application July 13, 1959, Serial No. 827,677

15 Claims. (Cl. 338—164)

This invention relates to sealed precision variable resistance devices and to sealed protective housings for precision instruments and, particularly, to such instruments employing a ball bearing supported rotatable shaft extending out of the housing.

A need has long existed for a method of protecting sensitive precision instruments against moisture when subjected to high humidity ambient conditions. While techniques are known for hermetically sealing instruments in a container, a difficulty exists if there is need for an externally actuated rotatable shaft to be connected to a device within the container.

The problem of sealing the shaft is not too severe if a sleeve type bearing is employed, however, in some applications a ball bearing support is needed. Many instruments must be capable of responding to extremely slight mechanical forces, often less than one inch-ounce of torque. Also, many precision instruments must be capable of operating for long periods at high rates of shaft rotation. Therefore, a ball bearing type mount is greatly to be preferred to a sleeve type bearing. Additionally, the ball bearing mount tolerates the side thrusts on the shaft such as result from even minor misalignments between the instrument shaft and the shaft of the apparatus to which the instrument is coupled. On the other hand, a sleeve type bearing subjected to a side thrust resulting from such misalignment will cause failure, particularly at high speeds of rotation. The use of a flexible coupling between shafts does not eliminate this side thrust problem.

While the preferred anti-frictional properties of ball bearing mounts are known, their use has been limited in applications requiring the provision of a sealed shaft entry.

It is also known to the art that ball bearing supported shafts may be sealed for purposes of oil retention as in an automobile transmission. However, the provision of a tight fitting frictional seal for an automobile transmission does not present a serious design problem since the designer has available an excess of horse power, a fraction of which may be employed, without detriment, in overcoming the resistance introduced by the shaft seal means. In the instance of the automobile the frictional loss in the seal is negligible compared to the total power available. If the same type oil seal were to be applied to a precision instrument, the frictional loss would render the instrument incapable of responding to small forces and would thereby render the instrument inoperative for its intended purpose.

A particular application of the present invention is in providing an improved potentiometer or variable resistance device. It may be appreciated that a potentiometer element having a terminal to terminal resistance of, say, 200,000 ohms would be rendered inaccurate by the presence of a moisture film which would change its resistance substantially. It is not uncommon for moisture to enter an enclosed but incompletely sealed housing in the form of vapor which then condenses to form a film or droplets of moisture. Further, the presence of moisture may provide a short circuit path along the insulator materials normally provided between terminals. Many commonly employed insulator materials tend to absorb moisture, thereby rendering them ineffective as electric insulators in the presence of moisture. Therefore, it is essential to provide means to keep moisture away from the potentiometer structure.

Accordingly, it is an object of this invention to provide an improved potentiometer device characterized by the ability to operate in humid atmospheres.

It is another object of this invention to provide a housing for a potentiometer having an outwardly extending shaft rotatably mounted in a ball bearing and having incorporated means to seal the housing against entrance of moisture vapor.

It is another object of this invention to provide a ball bearing shaft seal characterized by a long service life.

It is a further object of this invention to provide a ball bearing supported sealed shaft not subject to malfunction due to minor misalignment between the shaft and a device coupled thereto.

Still another object of this invention is to provide a rotary shaft seal for a ball bearing supported shaft capable of operating at temperatures substantially above normal room temperature.

Still another object of this invention is to provide means for sealing a ball bearing mounted shaft, wherein the sealing means is capable of operation over a wide range of temperature extremes, e.g. −65° C. to +65° C.

Still other objects and advantages of this invention will be in part pointed out with particularity and will in part become obvious as the following description proceeds taken in conjunction with the accompanying drawings.

Figure 1 is a front elevational view of a potentiometer housing made in accordance with the present invention.

Figure 2 is a vertical cross section taken along lines 2—2 of Figure 1.

Figure 3 is a cross section taken along lines 3—3 of Figure 2.

Referring to the drawings, there is shown a stainless steel housing 10, provided with a sealed ball bearing member 12. This bearing member is of the type provided with a labyrinth oil retention seal. The bearing member 12 is retained, in a chamber formed in member 10, by stainless steel plate 14. The plate 14 is secured to the housing 10 by screws 16. The back plate 18 is secured to the housing by mating threads 20. A stainless steel shaft 24 is rotatably supported in bearing 12. A secondary locating bearing 22, press-fit into a recess in back plate 18, supports the end of the shaft. It is preferrred to close the thread 20 by solder sealing the joint.

Axial movement of shaft 24 is limited in one direction by a retaining ring 26 inserted in an annular groove in shaft 24. Axial movement is prevented in the other direction by a tetrafluoroethylene member 32 tightly fit onto shaft 24 and a beryllium copper Belleville washer acting on flange 28 and plastic member 32 so as to seal member 32 against a portion of surface 29. Other inherently slippery plastics such as polychlorotrifluoroethylene and nylon may be employed for member 32.

Housing 10 is provided with an annular chamber 33 contiguous with the inner face 31 of bearing 12. Chamber 33 communicates with the annular chamber 34 surrounding a portion of shaft 24. Chambers 33 and 34 are filled with silicone grease such as Dow Corning Corporation, "DC–7." Chambers 33 and 34 may be regarded as a single silicone grease filled chamber.

Since tetrafluoroethylene washer 32 is press-fit onto shaft 24, the silicone grease 36 is prevented from flowing along shaft 24. The action of the Belleville washer 30 seals washer 32 against surface 29 to prevent flow of grease 36 along that surface.

It is preferred that the washer 32 be sealed against surface 29 along a circle of minimum diameter so as to introduce minimum frictional resistance.

It is to be particularly noted that in the preferred embodiment shown, the small diameter of the Belleville washer 30 is arranged to exert pressure against the portion of the tetrafluoroethylene washer 32 which is adjacent to shaft 24. Thus, sealing takes place along the intersection of wall 35, of chamber 34, and surface 29, thus providing minimum frictional engagement. It is not objectionable if the Belleville washer 30 exerts sufficient pressure to cause a moderate flow of the washer 32 into the annular cavity 34 adjacent to the shaft.

It has been found that the combination of the tetrafluoroethylene washer 32 and silicone grease 36 provides a satisfactory seal and that either one used alone fails to accomplish the desired objective.

Hermetic seal type terminals 40 provide means for making electrical connection to elements within the housing from external circuits. Hermetic seal terminals are commercially available and consists of a metal sleeve 42, an insulator glass bushing 44, and a hollow metal tube 46. Sleeve 42 is soldered to housing 10. The bare end of wire 48 is inserted into hollow tube 46 which is filled with solder 50 to complete the seal and provide electrical conductivity between the wire 48 and tube 46.

As is shown in Figures 2 and 3, insulator plastic plate 60 is fastened to housing 10 by means of conventional screws 62 mating with tapped holes in the housing. In the present embodiment there is shown a raised track conductive plastic resistance element 76 comolded to the insulator plate 60. An insulator plastic block 66 is force-fit onto shaft 24. A stainless steel block member 70, provided with split portions 70a and 70b, is secured to insulator 66 by bolt 71. Member 70b is tapped to receive the thread of bolt 71. Tightening of bolt 71 draws the two halves, 70a and 70b, together to act as a clamp. As an integral part of member 70, there is provided a take-off drum 78. Attached to the block 70 there is provided a spring member 72 carrying a precious metal alloy wiper contact 74. The wiper 74 rides on a resistance element 76. Take-off drum 78 is electrically connected by member 70, spring 72, and wiper 74 to the resistance element 76. The ends of wire 82 are solder connected to terminal 40b and terminal post 80 respectively. Hairspring wiper 81, riveted to terminal post 80, contacts drum 78 thus providing a complete circuit between wiper contact 74 and external terminal 40b.

In Figure 3 there are shown two terminals 91 and 92 connected to the ends of element 76. In Figure 2 there is shown a wire 48 solder connected between terminals 40a and 91. The exposed portions of the wire are insulated as shown. In like fashion a connection is provided between terminals 40c and 92. A section of insulator plastic 94 is inserted between the ends of resistance element 76 so as to electrically isolate the ends and to provide a support for wiper contact 74 so as to permit 360° rotation of the potentiometer shaft. Insulator member 96 is attached to back 18 by an adhesive.

While stainless steel is a preferred material for the housing 10, cover plates 14 and 18, and shaft 24 other materials consistent with the requirements for a given application for the device may be substituted.

For the purpose of filling chambers 33 and 34 silicone grease is preferred because of its low viscosity index. This particular material, therefore, retains useful sealing properties over a wide range of temperatures being useful from −65° C. to +65° C. and higher. For applications where extremes of temperature are not encountered, conventional hydrocarbon lubricating greases may be used and will be found to be fully effective. Any grease which would be used for the lubrication and sealing of gear boxes, transmissions, etc. may be used for the purposes of the present invention and throughout the normal range of application temperatures for such grease. A typical lubricating grease may consist of a calcium or sodium soap jelly emulsified with mineral oil. For use under low temperature conditions there is commercially available special-purpose greases containing glycerol and sorbitan esters.

While the invention has been described as embodied in a variable resistance device, such as a potentiometer, the principles disclosed may be applied with advantage to still other electrical transducers.

What is claimed is:

1. A variable resistance device comprising: a hollow housing member including first, second, and third interconnecting chambers extending therethrough to provide openings at opposite ends of said member; a cover closing one of the openings; a sealed ball bearing assembly tightly fitted into the first of the interconnecting chambers adjacent to the second chamber, closing the other of the openings; a shaft, rotatably supported by said bearing assembly, so as to provide a shaft portion cantilevered from said bearing assembly extending out of said housing member and a shaft portion extending through the second chamber and into the third chamber; a slippery resilient plastic member mounted on said shaft in a tight fitting relationship; silicone grease packed into said second chamber to provide a continuous barrier, between said housing member and said shaft, extending from said bearing assembly to said plastic member; means to maintain said plastic member in sliding contact with an internal portion of said housing concentric to said shaft, to close off the second chamber from the third chamber and retain said silicone grease in the second chamber; a resistance element mounted in the third chamber; sealed terminal means extending through said housing and connected to said resistance element; a movable electrically conductive wiper arranged to traverse said resistance element in response to rotation of said shaft; and sealed terminal means extending through said housing and connected to said wiper.

2. The device of claim 1 wherein said plastic member is made of tetrafluoroethylene.

3. The device of claim 1 wherein said plastic member is made of polychlorotrifluoroethylene.

4. The device of claim 1 wherein said plastic member is made of nylon.

5. The device of claim 1 including a bearing member carried by the said cover supporting one end of the said shaft and means to prevent axial movement of said shaft.

6. A sealed shaft actuated electrical transducer device comprising: a hollow housing member including first, second, and third interconnecting chambers extending therethrough to provide openings at opposite ends of said member; a cover closing one of the openings; a sealed ball bearing assembly tightly fitted into the first of the interconnecting chambers, adjacent to the second chamber, closing the other of the openings; a shaft, rotatably supported by said bearing assembly, so as to provide a shaft portion cantilevered from said bearing assembly extending out of said housing member and a shaft portion extending through the second chamber and into the third chamber; a slippery resilient plastic member mounted on said shaft in a tight fitting relationship; silicone grease packed into said second chamber to provide a continuous barrier between said housing member and said shaft extending from said bearing assembly to said plastic member; means to maintain said plastic member in sliding contact with an internal portion of said housing concentric to said shaft, to close off the second chamber from the third chamber and retain said silicone grease in the second chamber; a transducer mounted in the third chamber; sealed terminal means extending through said housing and connected to said transducer; and means coupling said transducer to said shaft.

7. The device of claim 6 including a bearing member carried by the said cover supporting one end of the said shaft and means to prevent axial movement of said shaft.

8. An apparatus comprising: a hollow housing member including first, second, and third interconnecting chambers extending therethrough to provide openings at opposite ends of said member; a cover closing one of the openings; a sealed ball bearing assembly tightly fitted into the first of the interconnecting chambers, adjacent to the second chamber, closing the other of the openings; a shaft, rotatably supported by said bearing assembly, so as to provide a shaft portion cantilevered from said bearing assembly extending out of said housing member and a shaft portion extending through the second chamber and into the third chamber; a slippery resilient plastic member mounted on said shaft in a tight fitting relationship; silicone grease packed into said second chamber to provide a continuous barrier between said housing member and said shaft extending from said bearing assembly to said plastic member; means to maintain said plastic member in sliding contact with an internal portion of said housing concentric to said shaft, to close off the second chamber from the third chamber and retain said silicone grease in the second chamber; and means for mounting, in the third chamber, an instrument coupled to said shaft.

9. The device of claim 8 including a bearing member carried by the said cover supporting one end of the said shaft and means to prevent axial movement of said shaft.

10. A variable resistance device comprising: a hollow housing member including first, second, and third interconnecting chambers extending therethrough to provide openings at opposite ends of said member; a cover closing one of the openings; a sealed ball bearing assembly tightly fitted into the first of the interconnecting chambers adjacent to the second chamber, closing the other of the openings; a shaft, rotatably supported by said bearing assembly, so as to provide a shaft portion cantilevered from said bearing assembly extending out of said housing member and a shaft portion extending through the second chamber and into the third chamber; a slippery resilient plastic member mounted on said shaft in a tight fitting relationship; grease packed into said second chamber to provide a continuous barrier, between said housing member and said shaft, extending from said bearing assembly to said plastic member; means to maintain said plastic member in sliding contact with an internal portion of said housing concentric to said shaft, to close off the second chamber from the third chamber and retain said grease in the second chamber; a resistance element mounted in the third chamber; sealed terminal means extending through said housing and connected to said resistance element; a movable electrically conductive wiper arranged to traverse said resistance element in response to rotation of said shaft; and sealed terminal means extending through said housing and connected to said wiper.

11. The device of claim 10 wherein said plastic member is made of tetrafluoroethylene.

12. The device of claim 10 wherein said plastic member is made of polychlorotrifluoroethylene.

13. The device of claim 10 where said plastic member is made of nylon.

14. A sealed shaft actuated electrical transducer device comprising: a hollow housing member including first, second, and third interconnecting chambers extending therethrough to provide openings at opposite ends of said member; a cover closing one of the openings; a sealed ball bearing assembly tightly fitted into the first of the interconnecting chambers, adjacent to the second chamber, closing the other of the openings; a shaft, rotatably supported by said bearing assembly, so as to provide a shaft portion cantilevered from said bearing assembly extending out of said housing member and a shaft portion extending through the second chamber and into the third chamber; a slippery resilient plastic member mounted on said shaft in a tight fitting relationship; grease packed into said second chamber to provide a continuous barrier between said housing member and said shaft extending from said bearing assembly to said plastic member; means to maintain said plastic member in sliding contact with an internal portion of said housing concentric to said shaft, to close off the second chamber from the third chamber and retain said grease in the second chamber; a transducer mounted in the third chamber; sealed terminal means extending through said housing and connected to said transducer; and means coupling said transducer to said shaft.

15. An apparatus comprising: a hollow housing member including first, second, and third interconnecting chambers extending therethrough to provide openings at opposite ends of said member; a cover closing one of the openings; a sealed ball bearing assembly tighlty fitted into the first of the interconnecting chambers, adjacent to the second chamber, closing the other of the openings; a shaft, rotatably supported by said bearing assembly, so as to provide a shaft portion cantilevered from said bearing assembly extending out of said housing member and a shaft portion extending through the second chamber and into the third chamber; a slippery resilient plastic member mounted on said shaft in a tight fitting relationship; grease packed into said second chamber to provide a continuous barrier between said housing member and said shaft extending from said bearing assembly to said plastic member; means to maintain said plastic member in sliding contact with an internal portion of said housing concentric to said shaft, to close off the second chamber from the third chamber and retain said grease in the second chamber; and means for mounting, in the third chamber, an instrument coupled to said shaft.

References Cited in the file of this patent

UNITED STATES PATENTS

| | | |
|---|---|---|
| 2,120,771 | Thompson | June 14, 1938 |
| 2,458,314 | Straub et al. | Jan. 4, 1949 |
| 2,460,795 | Warrick | Feb. 1, 1949 |
| 2,638,523 | Rubin | May 12, 1953 |
| 2,857,496 | Louis | Oct. 21, 1958 |